US010045277B2

(12) United States Patent
Sun et al.

(10) Patent No.: US 10,045,277 B2
(45) Date of Patent: *Aug. 7, 2018

(54) MOBILE DEVICE AND METHOD FOR RELAYING BY MOBILE DEVICE

(71) Applicant: HISENSE MOBILE COMMUNICATIONS TECHNOLOGY CO., LTD., Qingdao (CN)

(72) Inventors: Zizhi Sun, Qingdao (CN); Linhu Zhao, Qingdao (CN); Bin Zheng, Qingdao (CN); Chuanqing Yang, Qingdao (CN)

(73) Assignees: Hisense Mobile Communications Technology Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 128 days.

This patent is subject to a terminal disclaimer.

(21) Appl. No.: 15/056,277

(22) Filed: Feb. 29, 2016

(65) Prior Publication Data
US 2017/0094580 A1 Mar. 30, 2017

(30) Foreign Application Priority Data
Sep. 30, 2015 (CN) .......................... 2015 1 0642744

(51) Int. Cl.
H04W 40/22 (2009.01)
H04W 76/14 (2018.01)
(Continued)

(52) U.S. Cl.
CPC ......... *H04W 40/22* (2013.01); *H04L 61/1511* (2013.01); *H04L 61/256* (2013.01);
(Continued)

(58) Field of Classification Search
CPC . H04W 40/22; H04W 40/244; H04W 40/246; H04W 40/32; H04W 8/005;
(Continued)

(56) References Cited

U.S. PATENT DOCUMENTS

2007/0050418 A1  3/2007 Lin et al.
2007/0211714 A1* 9/2007 Metke ............... H04L 29/12066
                                                       370/389
(Continued)

FOREIGN PATENT DOCUMENTS

CN   102143509    8/2011
CN   201976256    9/2011
(Continued)

OTHER PUBLICATIONS

Office Action from corresponding Chinese Application No. 201510642744.8 dated Jan. 3, 2018 (7 pages).
(Continued)

*Primary Examiner* — Joshua Kading
(74) *Attorney, Agent, or Firm* — Harness, Dickey & Pierce, P.L.C.

(57) ABSTRACT

Embodiments of the application provide a mobile device and method for relaying by a mobile device, the mobile device comprising one or more processors, and a memory storing therein computer readable program codes configured to be performed by the one or more processors to perform: connecting with a wireless access point through a station node of Wireless Fidelity (Wi-Fi); invoking an interface of a network service in a relay application to send a relay instruction based upon a P2P node of Wi-Fi to a Wi-Fi module so that logon information of the mobile device is broadcasted and the mobile device is connected to one or more electronic devices through the P2P node; enabling a packet forward function to enable a data packet to be
(Continued)

forwarded between the different nodes of Wi-Fi in the mobile device; and invoking an address table service in the relay application to send configuration information of packet forwarding to the Wi-Fi module so that a data packet is forwarded between the station node and the P2P node.

15 Claims, 3 Drawing Sheets

(51) Int. Cl.
    *H04L 29/12*     (2006.01)
    *H04L 29/06*     (2006.01)
    *H04W 12/06*     (2009.01)
    *H04W 12/08*     (2009.01)
    *H04W 88/04*     (2009.01)
    *H04W 84/12*     (2009.01)
    *H04W 88/16*     (2009.01)

(52) U.S. Cl.
    CPC ...... *H04L 61/2514* (2013.01); *H04L 61/2557* (2013.01); *H04L 63/123* (2013.01); *H04W 12/06* (2013.01); *H04W 12/08* (2013.01); *H04W 76/14* (2018.02); *H04W 84/12* (2013.01); *H04W 88/04* (2013.01); *H04W 88/16* (2013.01)

(58) Field of Classification Search
    CPC ....... H04W 8/26; H04W 12/06; H04W 12/08; H04W 76/021; H04W 76/023; H04W 76/025; H04W 76/043; H04W 88/04; H04W 88/16; H04W 84/12; H04W 84/22; H04L 61/15; H04L 61/1505; H04L 61/1511; H04L 61/256; H04L 63/123
    See application file for complete search history.

(56) References Cited

U.S. PATENT DOCUMENTS

| | | |
|---|---|---|
| 2008/0229025 A1 | 9/2008 | Plamondon |
| 2010/0061268 A1 | 3/2010 | Nishio |
| 2011/0040870 A1 | 2/2011 | Wynn et al. |
| 2014/0056209 A1* | 2/2014 | Park ..................... H04W 88/04 370/315 |
| 2014/0334335 A1 | 11/2014 | Barathalwar |
| 2015/0244876 A1* | 8/2015 | Jabara ................... H04W 12/06 455/406 |
| 2016/0094662 A1 | 3/2016 | Kollu et al. |
| 2016/0174140 A1 | 6/2016 | Wu et al. |
| 2017/0041977 A1* | 2/2017 | Yokoyama ............ H04L 63/083 |
| 2017/0094578 A1* | 3/2017 | Sun .................... H04B 7/15507 |

FOREIGN PATENT DOCUMENTS

| | | |
|---|---|---|
| CN | 102342153 | 2/2012 |
| CN | 103401790 | 11/2013 |
| CN | 103857067 | 6/2014 |
| CN | 204145497 | 2/2015 |

OTHER PUBLICATIONS

Office Action from related Chinese Application No. 201510643875.8 dated Jan. 2, 2018 (7 pages).

\* cited by examiner

MOBILE DEVICE AND METHOD FOR RELAYING BY MOBILE DEVICE

CROSS-REFERENCE TO RELATED APPLICATION

This application claims the benefit and priority of Chinese Patent Application No. 201510642744.8 filed Sep. 30, 2015. The entire disclosure of the above application is incorporated herein by reference.

FIELD

The present disclosure relates to the field of mobile communications and particularly to a mobile device and method for relaying by a mobile device.

BACKGROUND

This section provides background information related to the present disclosure which is not necessarily prior art.

Along with the improving level of our social life, wireless signals, e.g., Wireless Fidelity (Wi-Fi), have been widely applied to the various aspects of our life due to their convenience.

The strength and coverage area of the wireless signals in use have become a significant factor bothering a user.

For example, if a router is placed in a sitting room, and a handset is placed in a bedroom, then there will be such a poor Wi-Fi signal that an access to the Internet may not be stable.

In another example, the searching handset locates a Wi-Fi signal outdoors, but the signal is so weak that the signal may not be stable in the room, and the signal can enable the access to the Internet only in a balcony or out of a window.

In a further example, if the user holding his or her handset is walking in a large room, then a blind spot of the signal may frequently occur, thus interrupting the access to the Internet, etc.

SUMMARY

This section provides a general summary of the disclosure, and is not a comprehensive disclosure of its full scope or all of its features.

In an aspect, An embodiment of the application provides a method for relaying by a mobile device, the method including:

connecting the mobile device with a wireless access point through a station node of Wireless Fidelity (Wi-Fi);

invoking an interface of a network service in a relay application to send a relay instruction based upon a P2P node of Wi-Fi to a Wi-Fi module so that logon information of the mobile device is broadcasted and the mobile device is connected to one or more electronic devices through the P2P node;

enabling a packet forward function to enable a data packet to be forwarded between the different nodes of Wi-Fi in the mobile device; and invoking an address table service in the relay application to send configuration information of packet forwarding to the Wi-Fi module so that a data packet is forwarded between the station node and the P2P node.

In another aspect, an embodiment of the application further provides a mobile device including one or more processors, and a memory storing therein computer readable program codes configured to be performed by the one or more processors to perform:

connecting with a wireless access point through a station node of Wireless Fidelity (Wi-Fi);

invoking an interface of a network service in a relay application to send a relay instruction based upon a P2P node of Wi-Fi to a Wi-Fi module so that logon information of the mobile device is broadcasted and the mobile device is connected to one or more electronic devices through the P2P node;

enabling a packet forward function to enable a data packet to be forwarded between the different nodes of Wi-Fi in the mobile device; and invoking an address table service in the relay application to send configuration information of packet forwarding to the Wi-Fi module so that a data packet is forwarded between the station node and the P2P node.

In a further aspect, n embodiment of the application further provides a storage medium storing therein computer readable program codes configured to be executed by one or more processors to perform:

connecting with a wireless access point through a station node of Wireless Fidelity (Wi-Fi);

invoking an interface of a network service in a relay application to send a relay instruction based upon a P2P node of Wi-Fi to a Wi-Fi module so that logon information of the mobile device is broadcasted and the mobile device is connected to one or more electronic devices through the P2P node;

enabling a packet forward function to enable a data packet to be forwarded between the different nodes of Wi-Fi in the mobile device; and invoking an address table service in the relay application to send configuration information of packet forwarding to the Wi-Fi module so that a data packet is forwarded between the station node and the P2P node.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
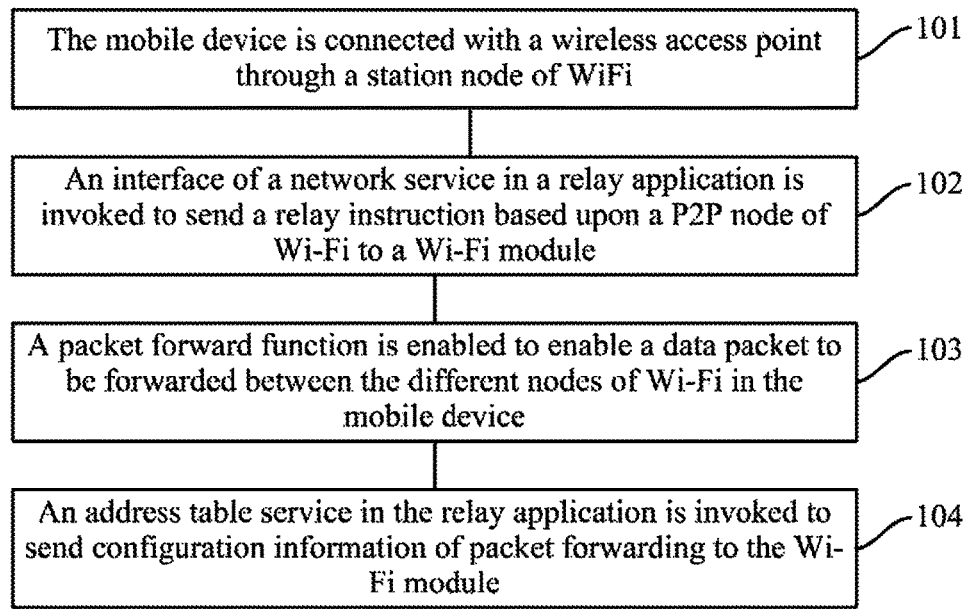
FIG. 1 is a flow chart of operations in a method for relaying by a mobile device according to an embodiment of the application.

Referring to FIG. 1, there is illustrated a flow chart of operations in a method for relaying by a mobile device according to an embodiment of the application, where the method can include the following operations:

In the operation 101, the mobile device is connected with a wireless access point through a station node of Wi-Fi.

It shall be noted that the embodiment of the application can be applicable to a relay application of the mobile device, e.g., a handset, a tablet computer, a smart wearable device (e.g., a smart watch), etc., and the relay application can be a third-party application (APP), or can be an application built in the mobile device, although the embodiment of the application will not be limited thereto.

These mobile devices generally support Windows Phone, Android, IOS, Windows, and other operating systems, and typically can be connected with a wireless Access Point (AP), e.g., a router, through Wireless Fidelity (Wi-Fi).

Figure 2:
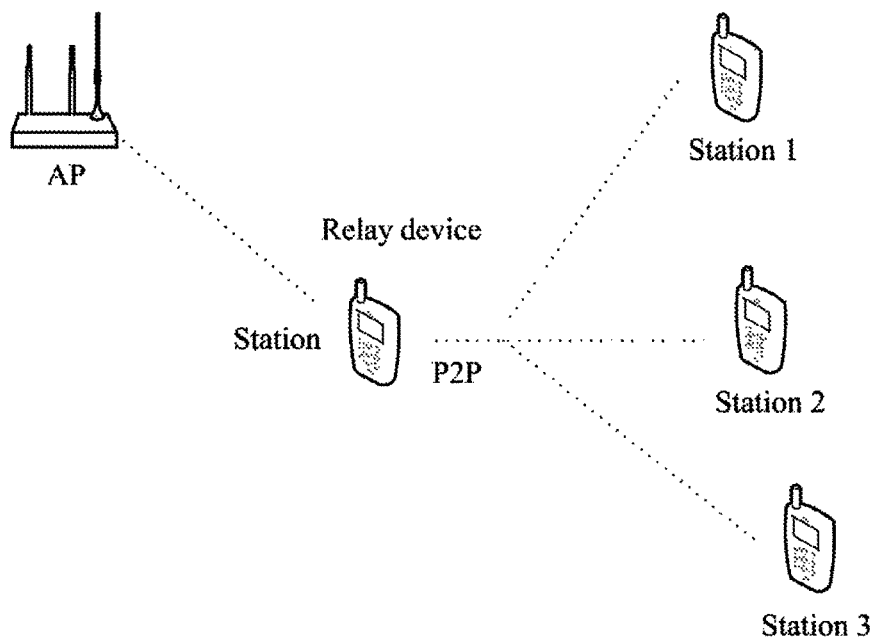
FIG. 2 is a diagram of a topology of a relay system according to an embodiment of the application.

As illustrated in FIG. 2, the AP is such a specific node in a wireless network that can access a base station, and through which another type of node in the wireless network can communicate with the outside or inside of the wireless network.

Wi-Fi of the mobile device typically functions as a station or a soft AP, or in P2P.

Particularly the station refers to such a device accessing the wireless network that can communicate with another device inside or a device outside the wireless network through a wireless access point.

The soft AP refers to the mobile device functioning as a wireless access point so that the soft AP-enabled mobile device can act as a router enabling an access of another station to the wireless network.

The P2P (Peer-to-Peer), also referred to as Wi-Fi Direct, can enable two Wi-Fi devices to be connected directly with and to communicate with each other without any AP.

In the embodiment of the application, before the relay function is enabled, firstly a network service, i.e., a Supplicant service, integrated in the relay application can be enabled so that the station function of the mobile device accesses the network service Supplicant in the relay application, and the relay function accesses another network service Supplicant carried in the relay application.

The getWifiState( ) function in WifiManager can be invoked to determine whether the mobile device is enabled as a station node of Wi-Fi.

If a station node being enabled is detected, then the API interface getNetworkInfo( ) available from ConnectivityManager can be invoked by inputting ConnectivityManager.TYPE_WIFI as a parameter thereto to determine whether the station node is connected with the AP.

If the NetworkInfo object returned is not Null, and isConnected( ) is true, then it will be determined that the station node is connected with the AP.

If it is determined that the station node is connected with the AP, then it will be determined that the mobile device is connected with the AP.

If it is determined that the station node is not enabled or is not connected with the AP, then a prompt message will be generated that connect to an AP, e.g., "Enable Wi-Fi and connect to a router".

In the operation 102, an interface of a network service in a relay application is invoked to send a relay instruction based upon a P2P node of Wi-Fi to a Wi-Fi module so that logon information of the mobile device is broadcasted, and the mobile device is connected to one or more electronic devices are connected through the P2P node.

As illustrated in FIG. 2, if Wi-Fi is connected with an active AP, then the relay instruction will be sent to the Wi-Fi module to enable Wi-Fi relaying.

Here the Wi-Fi module, also referred as a serial interface Wi-Fi module, at the transport layer of the Internet of Things can be an embedded module, an inbuilt wireless network protocol IEEE 802.11b.g.n protocol stack, and a TCP/IP protocol stack, configured to convert a serial interface or TTL level in compliance with a Wi-Fi wireless network communication standard.

A hardware device in which the Wi-Fi module is embedded can access the Internet directly using Wi-Fi, which is an important component to enable wireless intelligent home, Machine to Machine (M2M), and other Internet of Things applications.

In an embodiment of the application, the operation 102 can include the following sub-operations:

The sub-operation S11 is to detect a first channel over which the wireless access point is connected to the station node;

The sub-operation S12 is to calculate a second channel without interference from and to the first channel;

The sub-operation S13 is to obtain the logon information for logging onto the mobile terminal, wherein the logon information includes a service set identifier and a password;

The sub-operation S12 and the sub-operation S13 may not be performed in any strict sequential order, but firstly the sub-operation S12 or the sub-operation S13 may be performed, or the sub-operation S12 and the sub-operation S13 may be performed concurrently.

The sub-operation S14 is to calculate a first length of the service set identifier, and a second length of the password.

The sub-operation S15 is to encapsulate the second channel, the service set identifier, the first length, the password, and the second length in the relay instruction.

The sub-operation S16 is to invoke the interface of the network service in the relay application to send the relay instruction to the Wi-Fi module through a group mode of the P2P node of Wi-Fi to broadcast the service set identifier at the first length over the second channel.

If the station of Wi-Fi is enabled and connected with the AP, then the first channel of the AP connected to the station, can be obtained, and if P2P is enabled, then a command over the second channel without interference from and to the station can be sent.

In the Android system, WifiService is responsible for core services of the WiFi function, and particularly the WiFiStateMachine sub-system is responsible for maintaining various state information of WiFi.

The state information includes channel information of the AP, so the first channel of the AP with which the station node is connected can be obtained by invoking the mWifiStateMachine.fetchFrequencyNative( ) function of the system.

Frequencies corresponding to different channels are as follows:
Freq=2412 (Channel 1) Freq=2417 (Channel 2) Freq=2422 (Channel 3)
Freq=2427 (Channel 4) Freq=2432 (Channel 5) Freq=2437 (Channel 6)
Freq=2442 (Channel 7) Freq=2447 (Channel 8) Freq=2452 (Channel 9)
Freq=2457 (Channel 10) Freq=2462 (Channel 11) Freq=2467 (Channel 12)
Freq=2472 (Channel 13)

For the relay function to be performed, typically the first channel of the station and the second channel of the P2P shall not interfere with each other; otherwise, the relay function may forward data poorly and relay at degraded performance due to interference between the channels, which arises from the setting of the channels.

For a type of channel in the 2.4G band, the second channel can be the first channel shifted by at least 5 channels.

If X represents the first channel of the AP, and Y represents the second channel of the relay device (i.e., the mobile device), then both of them will satisfy the following relationship:

$$Y \geq X+5 \text{ or } Y \leq X-5;$$

Where X and Y are positive integers, and if Y<1 or Y>13, then Y will be invalidated and dropped.

For a type of channel in the 5G band, the second channel can be another channel than the first channel.

Then the user is asked in a User Interface (UI) to enter the service set identifier (SSID) and the password of the relay device (i.e., the mobile device).

If the user enters the SSID and the password on the UI, then the SSID and the password will be applied; if the user doesn't enter the SSID and the password on the UI, a default SSID and a default password will be applied.

The first length of the SSID, and the second length of the password are calculated for the relay instruction to be sent.

There are two existing P2P modes including a P2P group mode and a P2P client.

The P2P group mode enables a number of Wi-Fi devices to constitute a network (a P2P network, also referred to as a P2P group), and to communicate with each other, without any AP.

Before the P2P group is created, all the smart terminals are respective P2P devices.

After these P2P devices negotiate about P2P, one of the devices plays the role of a Group Owner (GO) (i.e., acts as an AP), and the other devices play the role of clients.

The original P2P group function is:
p2p_ctrl_group_add(struct wpa_supplicant *wpa_s, char *cmd)

In this P2P group function, none of the channel, the SSID, the password, and the other parameters can be transmitted.

In the embodiment of the application, the Wi-Fi protocol stack is modified by forcibly setting the P2P mode to the group mode in which the SSID and the password can be set as desirable to the user, so that the relay device (i.e., the mobile device) to which an external electronic device scans can be identified using the SSID, and communication can be secured using the password.

In the embodiment of the application, the network service Supplicant is added to the APP, an interface is added to the Supplicant service, and the P2P_GROUP_ADD instruction is extended in the Wi-Fi protocol stack Wpa_supplicant:
wpas_p2p_group_add_with_ssid(wpa_s, 1, freq, ht40, ssid, passphrase, ssid_len, passphrase_len)

Here freq represents the second channel, ssid_len represents the first length, passphrase represents the password, and passphrase_len represents the second length.

The channel, the SSID, the password, and the other parameters can be sent in the P2P group function extended.

After the relay instruction is sent, the relay device (i.e., the mobile device) sends a broadcast frame carrying the SSID, and the other electronic device scanning to the relay device can be connected using the SSID and the password.

In the operation 103, a packet forward function is enabled to enable a data packet to be forwarded between the different nodes of Wi-Fi in the mobile device.

The packet forward function can be enabled using the echo attribute value.

echo 1>/proc/sys/net/ipv4/ip_forward

Packet forwarding refers to forwarding a data packet from one device to another device.

In the embodiment of the application, the packet forwarding function is enabled to enable a data packet to be forwarded between the station and the P2P.

In the operation 104, an address table service in the relay application is invoked to send configuration information of packet forwarding to the Wi-Fi module so that a data packet is forwarded between the station node and the P2P node.

In a real application, the address table service iptables in the relay application can be invoked to send a routing table to the Wi-Fi module, where the routing table includes a route between a first IP address of the P2P node, and a second IP address of the station node; and The address table service iptables in the relay application can be invoked to send configuration information of the Network Address Translation (NAT) function to the Wi-Fi module, where the source IP address and the destination IP address of the IP packet are modified automatically by the NAT function to translate the first IP address of the P2P node.

Of course a prior routing table can be further removed before the routing table and the NAT function are sent.

The configuration information of iptables and NAT is as follows:

remove old rules (The prior routing table is removed)
iptables -F
iptables -t filter -F
iptables -t nat -F
Bring up NAT rules
iptables -t nat -A POSTROUTING -s 192.168.49.0/24 -d 0.0.0.0/0 -j MASQUERADE Particularly if the IP segment of the relay device (i.e., the mobile device) is 192.168.49.0, then "Bring up NAT rules" can be sent to re-encapsulate and de-encapsulate the data packet with the source address being the network segment of 192.168.49.0/24 by translating the source address into 0.0.0.0/0, and to forward the data packet to the station.

In an embodiment of the application, the method can further include the following operation:

In the operation 105, the address table service iptables in the relay application can be invoked to send configuration information of a Domain Name System (DNS) to the Wi-Fi module so that the data packet received by the P2P node is forwarded.

The address table service iptables in the relay application can be invoked to send the address of a gateway of the DNS based upon the Transport Control Protocol (TCP) to the Wi-Fi module.

The command format is:
iptables -t nat -I PREROUTING -i (the name of the relay device) -p tcp --dport 53 -j DNAT --to-destination (the router gateway); and The address table service iptables in the relay application can be invoked to send the address of the gateway of the DNS based upon the User Datagram Protocol (UDP) of Open System Interconnection to the Wi-Fi module.

The command format is:
iptables -t nat -I PREROUTING -i (the name of the relay device) -p udp --dport 53 -j DNAT --to-destination (the router gateway)

As described above, the DNS gateway addresses in the TCP and the UDP are added to the relay device (i.e., the mobile device), and after the DNS is configured, the IP address inputted is parsed by the DNS server for communication over the network.

In the embodiments of the application, the AP is connected through the station for communication, the electronic device is connected through the P2P node for communication, and data is forwarded between the station and the P2P node, to thereby perform the relay function in the mobile device; and since the mobile device has been widely popularized, the existing mobile device can be reused as a relay to thereby avoid additional hardware from being configured, so as to greatly lower the cost, since the system can be avoided from being modified in the relay application, portability of the mobile device can be greatly improved, and also since no fixed power source receptacle is required to power the mobile device, the well-portable mobile device can be adjusted in position to the strength of a signal to thereby greatly enhance the relayed wireless signal.

Figure 3:
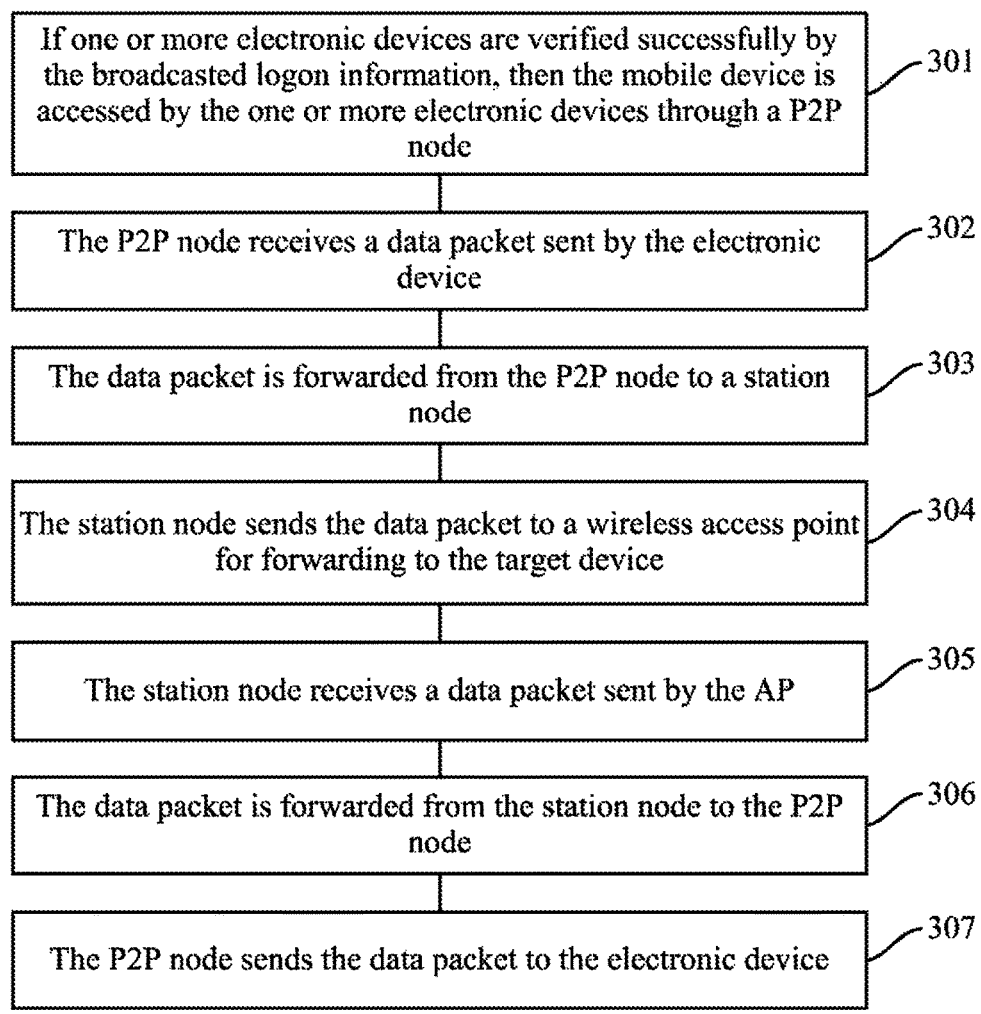
FIG. 3 is a flow chart of operations in a method for relaying by a mobile device according to another embodiment of the application.

Referring to FIG. 3, there is illustrated a flow chart of operations in a method for relaying by a mobile device according to another embodiment of the application, where the method can include the following operations:

In the operation 301, if one or more electronic devices are verified successfully by the broadcasted logon information, then the mobile device is accessed by the one or more electronic devices through a P2P node;

The relay device (i.e., the mobile device) can be regarded as an AP to broadcast a beacon frame periodically so that another station device scanning to the beacon frame can be provided with an SSID of the relay device (i.e., the mobile device).

If an application request sent by the one or more electronic devices for a service set identifier in the logon information is received, then a response message of Challenge Text is returned to the one or more electronic devices;

If a connection request sent by the one or more electronic devices is received, then a password in the connection request is verified for consistency with a password in the logon information according to a second length of the password in the logon information; and If the passwords in the connection request and the password in the logon information are consistent, then the one or more electronic devices access the P2P node, e.g., electronic devices of Station 1, Station 2, and Station 3 as illustrated in FIG. 2.

In the operation 302, the P2P node receives a data packet sent by the electronic device;

If the electronic device connected with the P2P node communicates with an external target device, then the electronic device will send the data packet to the relay device (i.e. the mobile device).

In the operation 303, the data packet is forwarded from the P2P node to a station node;

It is determined whether a source address of the data packet is a first IP address of the P2P node, e.g., 192.168.49.0, and if the source address of the data packet is the first IP address of the P2P node, then the first IP address is translated into a destination IP address of 0.0.0.0 based upon configuration information of NAT; and A routing table is searched for a second IP address corresponding to the first IP address, and since a packet forwarding function is enabled in advance, a data packet from the destination IP address translated can be forwarded to a station node at the second IP address.

In the operation 304, the station node sends the data packet to an AP for forwarding to the target device;

In a real application, the data packet includes Uniform Resource Locator (URL) information, and the AP maps the URL information to an IP address through a Domain Name System (DNS), and forwards the data packet to the target device at the IP address, e.g., a web server, through the base station illustrated in FIG. 2.

It shall be noted that the station node operates over a first channel, and the P2P node operates over a second channel, thus avoiding interference to each other.

In the operation 305, the station node receives a data packet sent by the AP.

If the external target device communicates with the electronic device connected with the P2P node, then the target device will send the data packet to the relay device (i.e., the mobile device) through the base station.

In the operation 306, the data packet is forwarded from the station node to the P2P node.

If a second IP address of the station node from which the data packet originates is determined, and the routing table is searched for a first IP address corresponding to the second IP address, then the data packet can be forwarded to the P2P node at the first IP address.

In the operation 307, the P2P node sends the data packet to the electronic device.

The relay device sends the data packet of the external target device to the electronic device through the P2P node to thereby relay the data packet.

It shall be noted that the station node operates over a first channel, and the P2P node operates over a second channel, thus avoiding interference to each other.

It shall be noted that for the sake of a concise description, the embodiments of the method have been described as a series of actions in combination, but those skilled in the art shall appreciate that the embodiment of the application will not be limited to the described order of the actions because some of the operations may be performed in another order or concurrently dependent upon the embodiments of the application. Secondly those skilled in the art shall also appreciate that all the embodiments described here are preferred embodiments, but all the actions involved in the embodiments may not be necessary to the embodiments of the application.

Figure 4:
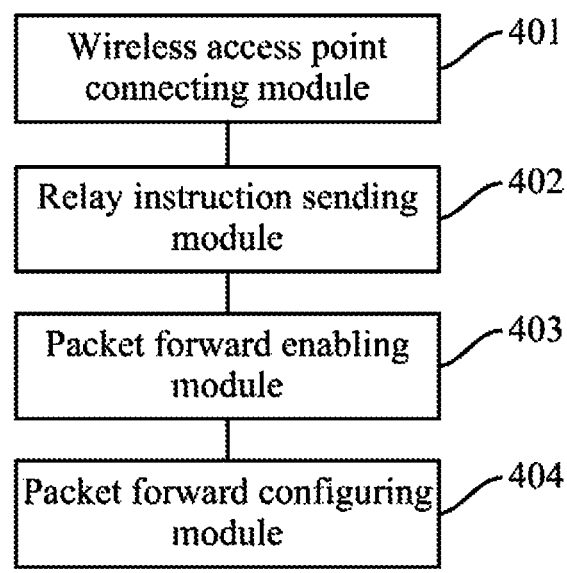
FIG. 4 is a schematic structural diagram of a mobile device according to an embodiment of the application.

Referring to FIG. 4, there is illustrated a structural block diagram of a mobile device according to an embodiment of the application, where the mobile device can include the following modules:

A wireless access node connecting module 401 is configured to connect with a wireless access point through a station node of Wi-Fi;

A relay instruction sending module 402 is configured to invoke an interface of a network service in a relay application to send a relay instruction based upon a P2P node of Wi-Fi to a Wi-Fi module so that logon information of the mobile device is broadcasted and the mobile device is connected to one or more electronic devices through the P2P node;

A packet forward enabling module 403 is configured to enable a packet forward function to enable a data packet to be forwarded between the different nodes of Wi-Fi in the mobile device; and A packet forward configuring module 404 is configured to invoke an address table service in the relay application to send configuration information of packet forwarding to the Wi-Fi module so that a data packet is forwarded between the station node and the P2P node.

In an embodiment of the application, the mobile device can further include the following module:

A DNS configuring module is configured to invoke the address table service in the relay application to send configuration information of a Domain Name System (DNS) to the Wi-Fi module so that the data packet received by the P2P node is forwarded.

In an embodiment of the application, the wireless access node connecting module 401 can include the following sub-modules:

An enabled Wi-Fi detecting sub-module is configured to determine whether the station node of Wi-Fi is enabled in the mobile device;

A connected wireless access point detecting sub-module is configured to determine whether the station node is connected with the wireless access point, when it is determined that the station node is enabled;

A connection determining sub-module is configured to determine that the mobile device is connected with the wireless access point, when it is determined that the station node is connected with the wireless access point; and A prompt message generating sub-module is configured to generate an instruction to be connected with the wireless access point, when it is determined that the station node is not enabled or is not connected with the wireless access point.

In an embodiment of the application, the relay instruction sending module 402 can include the following sub-modules:

A channel detecting sub-module is configured to detect a first channel over which the wireless access point is connected to the station node;

A channel calculating sub-module is configured to calculate a second channel without interference from and to the first channel;

A logon information obtaining sub-module is configured to obtain the logon information of the logging onto mobile device, where the logon information includes a service set identifier and a password;

A length calculating sub-module is configured to calculate a first length of the service set identifier, and a second length of the password;

A relay instruction encapsulating sub-module is configured to encapsulate the second channel, the service set identifier, the first length, the password, and the second length in the relay instruction; and A group broadcasting sub-module is configured to invoke the interface of the network service in the relay application to send the relay instruction to the Wi-Fi module through a group mode of the P2P node of Wi-Fi to broadcast the service set identifier at the first length over the second channel.

In an embodiment of the application, the packet forward configuring module 404 can include the following sub-modules:

A routing table sending sub-module is configured to invoke the address table service in the relay application to send a routing table to the Wi-Fi module, where the routing table includes a route between a first Internet Protocol (IP) address of the P2P node, and a second IP address of the station node; and An NAT sending sub-module is configured to invoke the address table service in the relay application to send configuration information of a Network Address Translation (NAT) function to the Wi-Fi module so that the first IP address of the P2P node is translated.

In an embodiment of the application, the DNS configuring module can include the following sub-modules:

A TCP configuration sending sub-module is configured to invoke the address table service in the relay application to send the address of a gateway of the Domain Name System (DNS) based upon the Transport Control Protocol (TCP) to the Wi-Fi module; and A UDP configuration sending sub-module is configured to invoke the address table service in the relay application to send the address of the gateway of the Domain Name System (DNS) based upon the User Datagram Protocol (UDP) of Open System Interconnection to the Wi-Fi module.

In an embodiment of the application, the mobile device can further include the following module:

A device accessing module is configured, if the one or more electronic devices are verified successfully by the broadcasted logon information, to have the one or more electronic devices access the P2P node.

In an embodiment of the application, the device accessing module can further include the following sub-modules:

A responding sub-module is configured, if an application request sent by the one or more electronic devices for a service set identifier in the logon information is received, to return a response message to the one or more electronic devices;

A verifying sub-module is configured, if a connection request sent by the one or more electronic devices is received, to verify a password in the connection request for consistency with a password in the logon information according to a second length of the password in the logon information; and if the passwords in the connection request and the password in the logon information are consistent, to invoke an access sub-module; and The accessing sub-module is configured to have the one or more electronic device access.

In an embodiment of the application, the mobile device can further include the following modules:

A first data packet receiving module is configured to receive in the P2P node a data packet sent by the electronic device;

A first data packet forwarding module is configured to forward the data packet from the P2P node to the station node; and A first data packet sending module is configured to send the data packet in the station node to the wireless access point for forwarding to a target device.

The data packet includes Uniform Resource Locator (URL) information, and the wireless access point maps the URL information to an IP address through a Domain Name System (DNS), and forwards the data packet to the target device at the IP address.

In an embodiment of the application, the first data packet forwarding module can include the following sub-modules:

An IP address determining sub-module is configured to determine whether a source address of the data packet is a first IP address of the P2P node; and if the source address of the data packet is the first IP address of the P2P node, to invoke a translating sub-module;

The translating sub-module is configured to translate the first IP address into a destination IP address;

A first routing table searching sub-module is configured to search a routing table for a second IP address corresponding to the first IP address; and A first forwarding sub-module is configured to forward a data packet converted from the destination IP address to the station node at the second IP address.

In an embodiment of the application, the mobile device can further include the following modules:

A second data packet receiving module is configured to receive in the station node a data packet sent by the wireless access point;

A second data packet forwarding module is configured to forward the data packet from the station node to the P2P node; and A second data packet sending module is configured to send the data packet in the P2P node to the electronic device.

In an embodiment of the application, the second data packet forwarding module can include the following sub-modules:

An IP address determining sub-module is configured to determine a second IP address of a station node from which the data packet originates;

A second routing table searching sub-module is configured to search a routing table for a first IP address corresponding to the second IP address; and A second forwarding sub-module is configured to forward the data packet to the P2P node at the first IP address.

Another embodiment of the application further provides a mobile device including one or more processors, and a memory storing therein computer readable program codes configure to be executed by the one or more processors to perform the methods for relaying by a mobile device according to the embodiments illustrated in FIG. 1 to FIG. 3, so a repeated description thereof will be omitted here.

Moreover an embodiment of the application further provides a computer readable storage medium which can be a computer readable storage medium included in the memory in the embodiment above, or which can be a separate computer readable storage medium which is not installed in the mobile device. The computer readable storage medium stores therein one or more programs (in some embodiments, the computer readable storage medium can be one or more magnetic discs storage devices, flash memory devices, or other nonvolatile solid storage devices, CD-ROMs, optical memories, etc.) configured to be executed by one or more processors to perform the methods for relaying by a mobile device as described in the embodiments above.

Since the embodiments of the mobile device are substantially similar to the embodiments of the method, the embodiments of the mobile device have been described in brief, and reference can be made to the description of the embodiments of the method for details of the embodiments of the mobile device.

The respective embodiments in the description have been described progressively, and each of the embodiments has been focused on its differences from the other embodiments, and the description of their commonalities can be applied to each other.

Those skilled in the art shall appreciate that the embodiments of the application can be embodied as a method, an apparatus, or a computer program product. Therefore the application can be embodied in the form of an all-hardware embodiment, an all-software embodiment or an embodiment of software and hardware in combination. Furthermore the application can be embodied in the form of a computer program product embodied in one or more computer useable storage mediums (including but not limited to a disk memory, a CD-ROM, an optical memory, etc.) in which computer useable program codes are contained.

The application has been described in a flow chart and/or a block diagram of the method, the device (system) and the computer program product according to the embodiments of the application. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

It shall be further noted that such relationship terms in this context as first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . " will not exclude the presence of one or more additional identical element in the process, the method, the article or the device including the element.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile device, comprising:
   one or more processors; and
   a memory storing instructions, wherein the one or more processors are configured to execute the instructions to:
   connect with a wireless access point through a station node of Wireless Fidelity (Wi-Fi);
   call an interface of a network service in a relay application to send a relay instruction based upon a P2P node of Wi-Fi to a Wi-Fi module in the mobile device to broadcast logon information of the mobile device and to connect the mobile device to one or more electronic devices through the P2P node;

enable a packet forward function in the mobile device to support forwarding of a data packet between different nodes of Wi-Fi;

invoke an address table service in the relay application to send configuration information of the data packet to be forwarded to the Wi-Fi module so that the data packet is forwarded between the station node and the P2P node; and invoke the address table service in the relay application to send configuration information of a domain name system (DNS) to the Wi-Fi module to forward the data packet received by the P2P node, by sending an address of a gateway of the DNS based upon a transport control protocol (TCP) to the Wi-Fi module and sending the address of the gateway of the DNS based upon a user datagram protocol (UDP) of an open system interconnection protocol to the Wi-Fi module.

2. The mobile device according to claim 1, wherein the one or more processors are configured to further execute the instructions to:

detect a first channel over which the wireless access point is connected to the station node;

calculate a second channel which does not interfere with the first channel;

obtain the logon information for logging onto the mobile device, wherein the logon information comprises a service set identifier and a password;

calculate a length of the service set identifier and a length of the password;

encapsulate information associated with the second channel, the service set identifier, the length of the service set identifier, the password, and the length of the password in the relay instruction; and call the interface of the network service in the relay application to send the relay instruction to the Wi-Fi module such that the service set identifier is broadcasted through a group mode of the P2P node of Wi-Fi over the second channel.

3. The mobile device according to claim 1, wherein the one or more processors are configured to further execute the instructions to:

invoke the address table service in the relay application to send a routing table to the Wi-Fi module, wherein the routing table comprises a route between a first internet protocol (IP) address of the P2P node, and a second IP address of the station node; and invoke the address table service in the relay application to send configuration information of a network address translation (NAT) function to the Wi-Fi module so that the first IP address of the P2P node is translated.

4. The mobile device according to claim 3, wherein the one or more processors are configured to further execute the instructions to:

receive in the P2P node a data packet from at least one of the one or more electronic devices;

forward the data packet from the P2P node to the station node; and send the data packet from the station node to the wireless access point for forwarding to a target device.

5. The mobile device according to claim 3, wherein the one or more processors are configured to further execute the instructions to:

receive in the station node a data packet from the wireless access point;

forward the data packet from the station node to the P2P node; and send the data packet from the P2P node to at least one of the one or more electronic devices.

6. A non-transitory storage medium, storing therein computer readable program codes configured to be executed by one or more processors to perform:

connecting with a wireless access point through a station node of Wireless Fidelity (Wi-Fi);

calling an interface of a network service in a relay application to send a relay instruction based upon a P2P node of Wi-Fi to a Wi-Fi module in the mobile device to broadcast logon information of the mobile device and to connect the mobile device to one or more electronic devices through the P2P node;

enabling a packet forward function in the mobile device to support forwarding of a data packet between different nodes of Wi Fi;

invoking an address table service in the relay application to send configuration information of the data packet to be forwarded to the Wi-Fi module so that the data packet is forwarded between the station node and the P2P node; and invoking the address table service in the relay application to send configuration information of a domain name system (DNS) to the Wi-Fi module to forward a data packet received by the P2P node, by sending an address of a gateway of the DNS based upon a transport control protocol (TCP) to the Wi-Fi module and sending the address of the gateway of the DNS based upon a user datagram protocol (UDP) of an open system interconnection protocol to the Wi-Fi module.

7. A method for relaying by a mobile device, the method comprising:

connecting, by the mobile device, with a wireless access point through a station node of Wireless Fidelity (Wi-Fi);

calling an interface of a network service in a relay application to send a relay instruction based upon a P2P node of Wi-Fi to a Wi-Fi module in the mobile device to broadcast logon information of the mobile device and to connect the mobile device to one or more electronic devices through the P2P node;

enabling a packet forward function in the mobile device to support forwarding of a data packet between different nodes of Wi Fi;

invoking an address table service in the relay application to send configuration information of the data packet to be forwarded to the Wi-Fi module so that the data packet is forwarded between the station node and the P2P node; and invoking the address table service in the relay application to send configuration information of a domain name system (DNS) to the Wi-Fi module to forward a data packet received by the P2P node, by sending an address of a gateway of the DNS based upon a transport control protocol (TCP) to the Wi-Fi module and sending the address of the gateway of the DNS based upon a user datagram protocol (UDP) of an open system interconnection protocol to the Wi-Fi module.

8. The method according to claim 7, wherein calling the interface of the network service in the relay application to send the relay instruction based upon the P2P node of Wi-Fi to the Wi-Fi module comprises:

detecting a first channel over which the wireless access point is connected to the station node;

calculating a second channel which does not interfere with the first channel;

obtaining the logon information for logging onto the mobile device, wherein the logon information comprises a service set identifier and a password;

calculating a length of the service set identifier and a length of the password;

encapsulating information associated with the second channel, the service set identifier, the length of the service set identifier, the password, and the length of the password in the relay instruction; and calling the interface of the network service in the relay application to send the relay instruction to the Wi-Fi module such that the service set identifier is broadcasted through a group mode of the P2P node of Wi-Fi over the second channel.

9. The method according to claim 7, wherein invoking the address table service in the relay application to send the configuration information of the data packet to be forwarded to the Wi-Fi module comprises:

invoking the address table service in the relay application to send a routing table to the Wi-Fi module, wherein the routing table comprises a route between a first Internet Protocol (IP) address of the P2P node, and a second IP address of the station node; and invoking the address table service in the relay application to send configuration information of a Network Address Translation (NAT) function to the Wi-Fi module so that the first IP address of the P2P node is translated.

10. The method according to claim 7, wherein the method further comprises:

upon receiving an application request with respect to a service set identifier in the logon information from the one or more electronic devices, checking whether a password in the connection request is the same as a password in the logon information; and in response to the password in the connection request being the same as the password in the logon information, having the one or more electronic devices access the P2P node.

11. The method according to claim 10, further comprising:

receiving in the P2P node a data packet from the electronic device;

forwarding the data packet from the P2P node to the station node; and sending the data packet from the station node to the wireless access point for forwarding to a target device.

12. The method according to claim 11, wherein the data packet comprises Uniform Resource Locator (URL) information mapped by the wireless access point to an IP address through a DNS, and is forwarded to the target device at the IP address.

13. The method according to claim 11, wherein forwarding the data packet from the P2P node to the station node comprises:

determining whether a source address of the data packet is a first IP address of the P2P node;

in response to determining that the source address of the data packet is the first IP address of the P2P node, translating the first IP address into a destination IP address;

searching a routing table for a second IP address corresponding to the first IP address; and forwarding a data packet from the destination IP address to the station node at the second IP address.

14. The method according to claim 10, further comprising:

receiving in the station node a data packet sent from the wireless access point;

forwarding the data packet from the station node to the P2P node; and sending the data packet from the P2P node to the electronic device.

15. The method according to claim 14, wherein forwarding the data packet from the station node to the P2P node comprises:

determining a second IP address of a station node from which the data packet originates;

searching a routing table for a first IP address corresponding to the second IP address; and forwarding the data packet to the P2P node at the first IP address.

* * * * *